(12) United States Patent
Lidgett (10) Patent No.: US 6,616,882 B1
(45) Date of Patent: Sep. 9, 2003

(54) HOSE TEXTURING APPARATUS AND METHOD

(75) Inventor: Jeremy Jay Lidgett, Norfolk, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/786,172

(22) PCT Filed: Nov. 2, 1998

(86) PCT No.: PCT/US98/23326

§ 371 (c)(1),
(2), (4) Date: Feb. 28, 2001

(87) PCT Pub. No.: WO00/26008

PCT Pub. Date: May 11, 2000

(51) Int. Cl.[7] .......................... B29C 59/02; B29C 59/04
(52) U.S. Cl. ..................... 264/284; 264/310; 425/329; 425/335; 425/392
(58) Field of Search ................ 264/284, 310; 425/329, 335, 392

(56) References Cited

FOREIGN PATENT DOCUMENTS

| DE | 2304854 A | 8/1974 |
|---|---|---|
| FR | 1306295 A | 2/1963 |
| FR | 1354863 A | 6/1964 |
| FR | 1476393 A | 6/1967 |
| GB | 2171167 A | 8/1986 |
| WO | 95/35196 A1 | 12/1995 |

*Primary Examiner*—Leo B. Tentoni
(74) *Attorney, Agent, or Firm*—Richard B. O'Planick; Nancy T. Krawczyk (57) ABSTRACT

An apparatus and method for imprinting a hose (2) with a continuous grip enhancing texture is disclosed. The texturing device (C, C') is comprised of a circular guide tube (8) through which the hose (2) to be textured is driven. The guide tube (8) is rotated, by a drive (4). Texturing means mounted at the exit end of the guide tube (8) are also rotated about the hose (2) as the texture is applied to the hose (2). The texturing of the hose is accomplished by at least one roller (6) mounted on a chuck (5) or by at least one scribing pen (28) mounted on a bracket (24).

7 Claims, 7 Drawing Sheets

HOSE TEXTURING APPARATUS AND METHOD

TECHNICAL FIELD

The disclosed invention is directed toward hose manufacturing. More specifically, the disclosed invention is directed towards a tool for imprinting a texture on a hose cover during manufacturing.

BACKGROUND ART

Textured hoses are known in the art, with a variety of methods to accomplish such hoses. A pattern may be generated on the outer surface of the hose due to an underlying reinforcement layer, as disclosed in U.S. Pat. No. 4,957,792. Alternatively, by corrugated the hose material and applying a fabric layer as the outermost layer, as disclosed in U.S. Pat. No. 4,307,754 or U.S. Pat. No. 4,106,967. Additionally, U.S. Pat. No. 1,749,207 discloses applying a spiny projection material on tubular articles to create a textured article.

Currently in hose manufacturing, a texture may be applied to the hose cover by a multi-step process, involving numerous man-hours and extra equipment and material that is eventually discarded after the process is employed. However, the resulting texture is not the intended result of the process, but a side benefit which the disclosed invention seeks to emulate by a quicker and cheaper process, yielding a variably textured hose which can be quickly altered to any desired texture or pattern.

The multi-step process which results in the conventionally textured elastomeric hose is accomplished by first forming the hose carcass, extruding a cover layer over the carcass, and then helically wrapping a fabric, preferably nylon, about the cover. The wrapped hose is then cured and the fabric is stripped off the hose. During curing, the hose is limited in expansion by the helically wrapped fabric, with the hose expanding into the fabric. When the fabric is stripped off, an imprint of the fabric texture is achieved on the hose cover. The resulting texture is a fine pattern with a helical strip extending the length of the hose.

The present invention eliminates the material and time consuming wrapping and unwrapping step conventionally employed. The disclosed method improves the grip characteristics of the hose. Gripping of the hose is beneficial in a variety of environments, and desired by those working in hot, cold, or wet environments. The texture imparted onto the hose by the above referenced conventional method is not an aggressive pattern and fails to provide grip characteristics to the hose.

U.S. Pat. No. 5,244,619 discloses a catheter forming process wherein the outer diameter of the catheter may be left in a rough configuration for reducing the friction characteristics. In the described process, a relatively thick layer of thermoplastic polymer is extruded onto a mandrel, and then a helically wound reinforcing material is submerged into the extruded polymer. The depth the material is submerged into the polymer is controlled by the temperature of the polymer. After the material is laid onto the polymer, and allowed to submerge, the polymer flows up creating a peaked, diamond or waffled contour.

The above method of achieving a textured surface is limited to the flow pattern of the polymer about the type of reinforcing material employed, resulting in an inconsistent pattern for the length of the hose. The present invention provides a more accurate production of a rough pattern on the external surface of an extruded hose or other tubular shaped article, ensuring a desired grip characteristic for the hose. Additionally, the present invention enables the reproduction of a variety of patterns for the hose texture.

SUMMARY OF THE INVENTION

The object of the present invention is the manufacture of a multi-layer laminate hose provided with a texture that overcomes the limitations of the current state of the art.

In accordance with the object of the present invention, an apparatus for forming a textured hose is disclosed.

The apparatus is comprised of a guide tube, drive means, and texturing means. The drive means is mounted about the guide tube and rotates the guide tube about the hose prior to texturing.

According to one embodiment of the disclosed invention, the texture means is at least one texturing element mounted on a chuck. The chuck attaches to the guide tube and rotates about the hose. The texturing elements on the chuck may be at least one, or a set of, knurled texture rollers or at least one, or a set of, scribing pens mounted on chuck jaws.

According to a second embodiment of the disclosed invention, the texture means are mounted in brackets attached to the guide tube. Mounted on each bracket a scribing pen is retained by a penholder. The scribing pen may be provided with a point for inscribing continuous lines on the hose, or a rotatable scribing roller for imprinting a continuous pattern on the hose.

The disclosed method is defined by feeding the covered hose into the texturing device while rotating the guide tube and the texturing elements about the hose. In one embodiment, when the scribing rollers are used for imprinting the texture onto the hose, the rollers also rotate upon the hose surface.

BRIEF DESCRIPTION OF DRAWINGS

The invention will be described by way of example and with reference to the accompanying drawings in which.

DETAILED DESCRIPTION OF THE INVENTION

Figure 1:
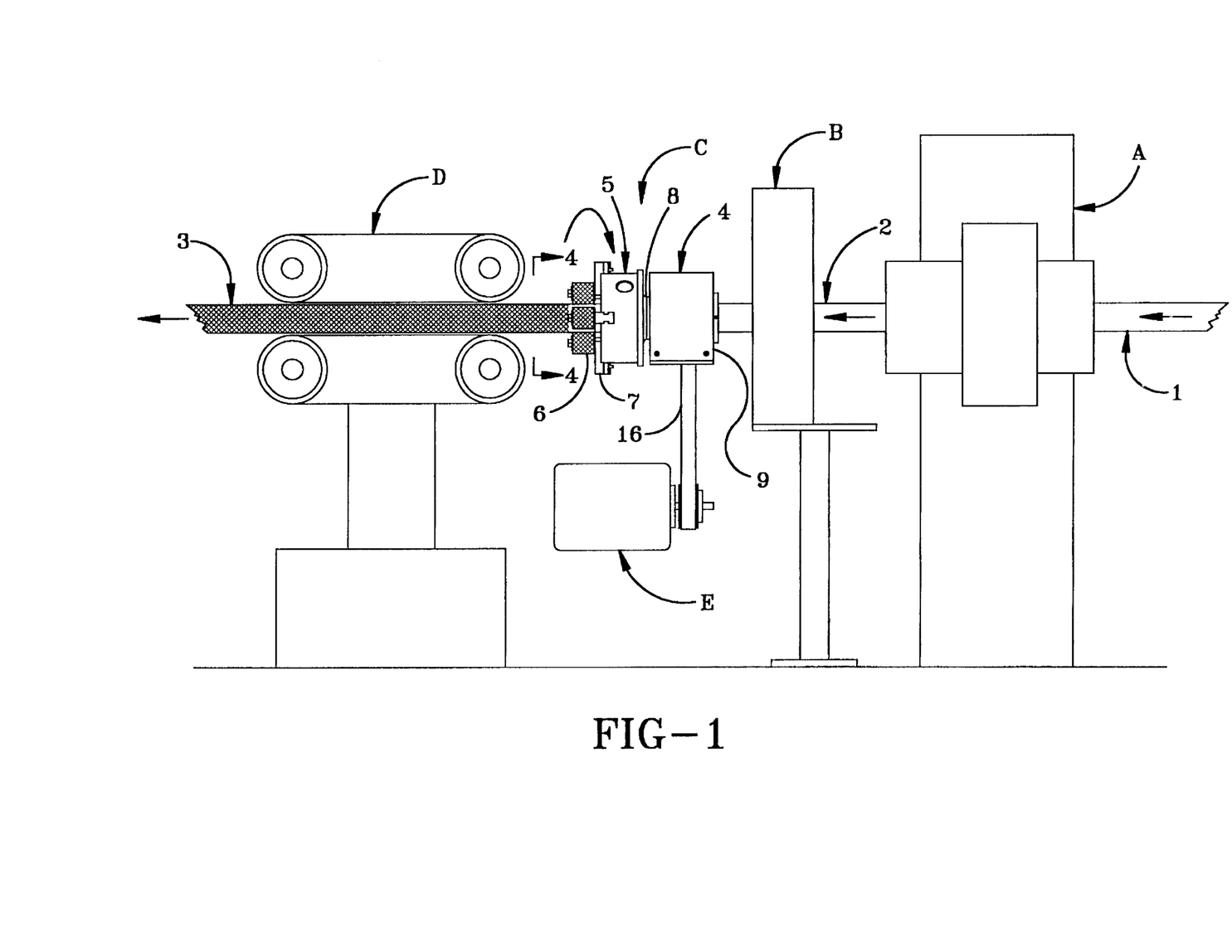
FIG. 1 is an overview of the hose cover application manufacturing process incorporating the inventive texturing apparatus.

Illustrated in FIG. 1 is an overview of the hose covering and texturing process. The uncovered hose 1, conventionally referred to as a hose carcass, is fed into a cover extruder A in the direction indicated by the arrow. The hose carcass 1 may be of any configuration depending upon the hose specification required. The cover extruder A applies an elastomeric or thermoplastic cover onto the hose carcass 1. After extrusion, the covered hose 2 may be fed through a target system B. The target system B determines the outside diameter (OD) of the hose 2, and automatically adjusts the thickness of the extruded cover to obtain the desired hose OD. If a target system B is not employed, a guide system may be positioned between the extruder A and the texturing device C to ensure that the centerline of the hose 2 is lined up with the centerline of the texturing device C. The covered hose 2 is then fed into the texture device C. A conventional soft belt hose puller D for pulling the hose 1, 2, 3 through the cover application system may also be a part of the manufacturing process. The covered, textured hose 3 is then fed into further processes such as labeling, cooling, or curing; the further processes, and the order in which they are accomplished, are dependent upon whether a rubber or plastic hose is being manufactured, and the usual order of manufacturing employed by the hose manufacturer.

The texture device C is divided into two portions, the right hand portion, relative to the hose direction illustrated, is the drive base 4, and the left hand portion is the chuck 5 with attached texturing means. The illustrated texturing means are a set of texture rollers 6 mounted on chuck jaws 7. The drive base 4 of the texture device C is driven by a connected motor E, causing the guide tube 8 and chuck 5 to rotate as the hose 2 travels through the device C. As the hose 2 is moving through the rotating device C, the friction between the rollers 6 and the hose 2 act to rotate the texture rollers 6, imprinting the hose 2 with the desired texture. The drive base 4 is enclosed inside a bearing housing flame 9 for mounting the texture device C within the manufacturing line.

Figure 2:
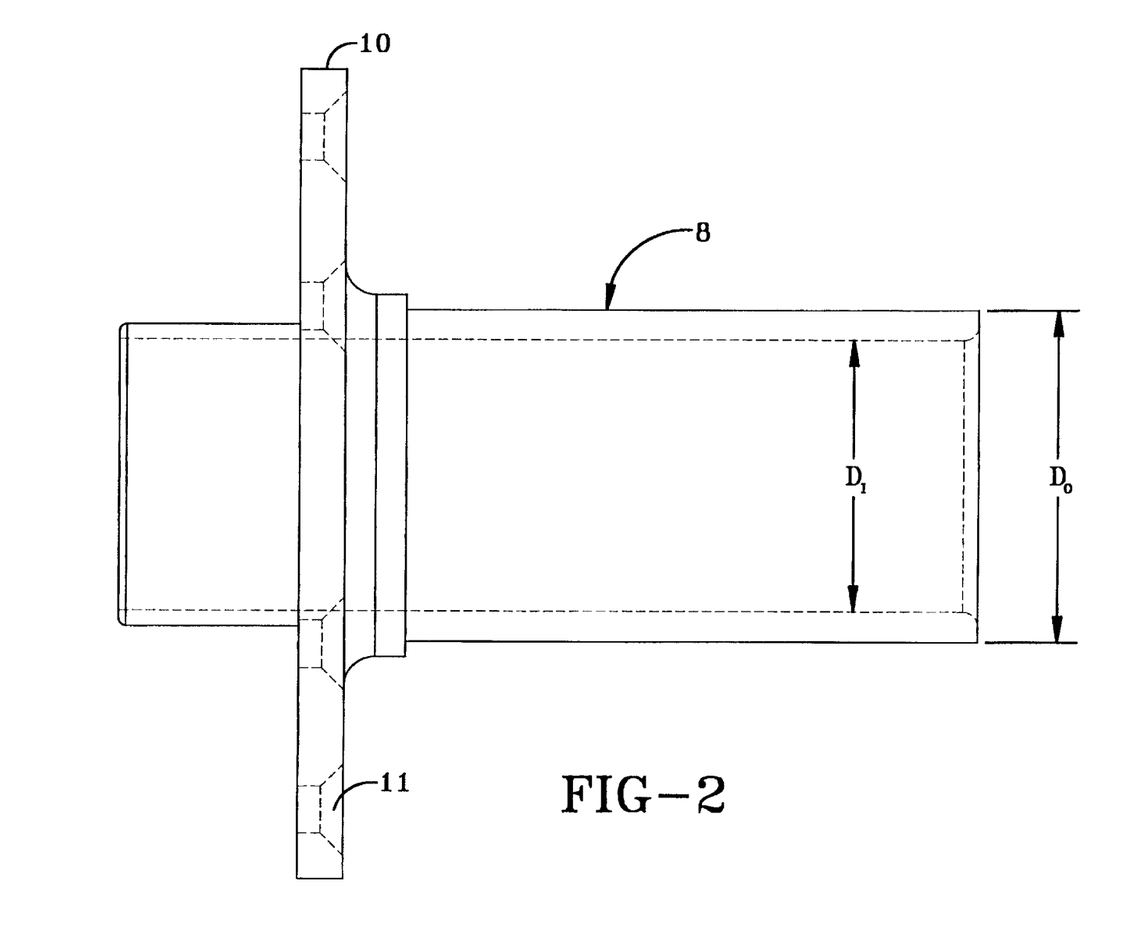
FIG. 2 is a schematic of the guide tube.

The texturing device C may be sized to texture either a limited hose diameter range or an unlimited diameter range. The maximum hose size is determined by the guide tube 8. The guide tube 8, illustrated in FIG. 2, extends the full width of the texture device C, connecting the drive base 4 and the chuck 5. The guide tube 8 has a constant internal diameter $D_I$. A constant internal diameter enables simpler manufacturing of the guide tube, however, the tube is not limited to a constant internal diameter $D_I$, but may vary the length of the tube 8. The external diameter $D_o$ of the guide tube is selected base upon the bored internal diameters of the differing components of the texturing device, discussed below. If a variable external diameter $D_o$ is selected, the transition may occur at the extending ring plate 10 as illustrated. Alternatively, the outside diameter $D_o$ may be substantially identical on both sides of the ring plate 10. The extending ring plate 10 is provided with means 11 to secure the chuck 5 to the guide tube 8. Illustrated are means 11 for countersunk cap screws, but other conventional means are permissible.

Figure 3:
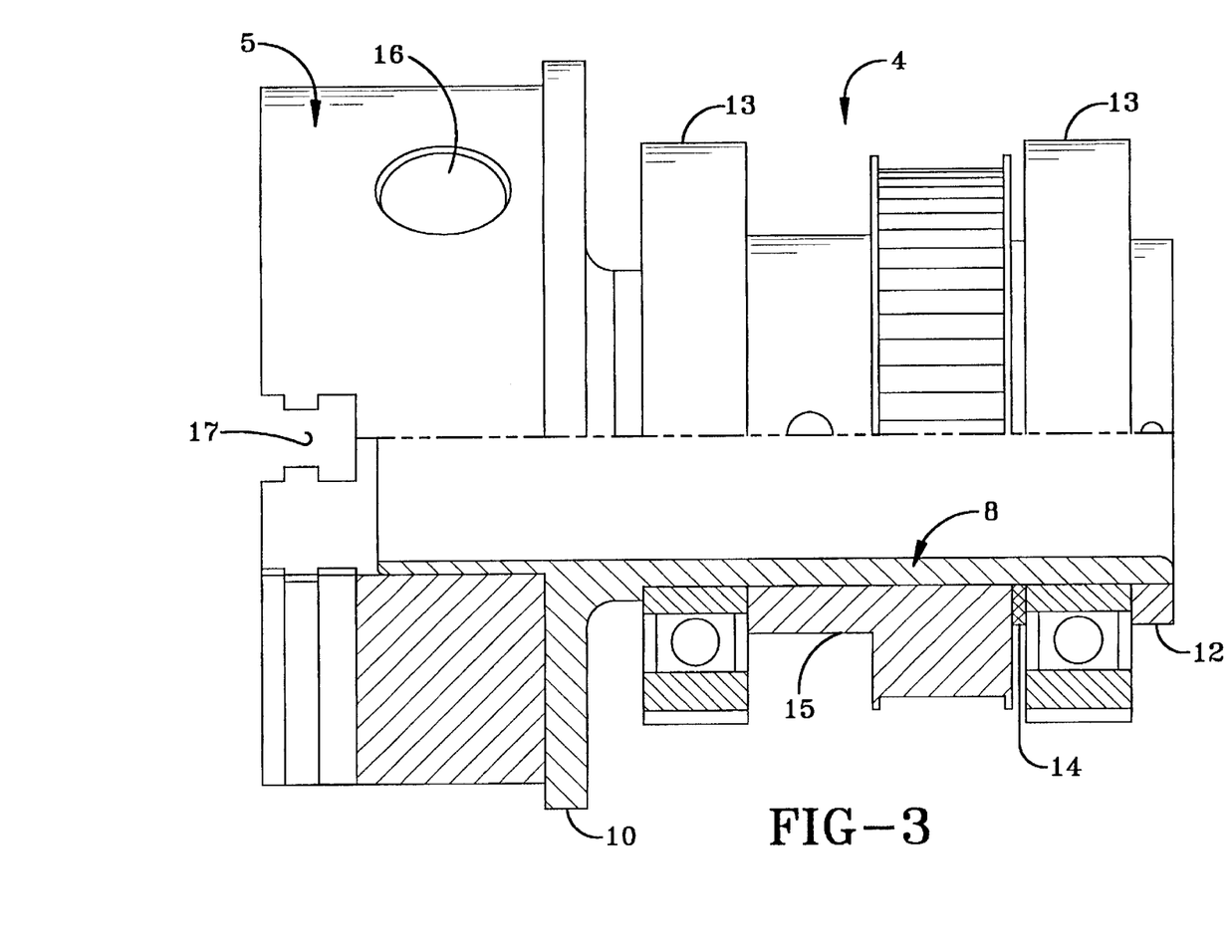
FIG. 3 is a partial sectional side view of an embodiment of the inventive hose cover texture apparatus.

Illustrated in FIG. 3 is the texture device C, without the chuck jaws 7 and the bearing housing frame 9. The drive base 4 employs an outer locking ring 12, two self-aligning bearings 13, an interior shim 14 for spacing, and a gear belt pulley 15. The locking ring 12, bearings 13, shim 14, and pulley 15 are aligned about the guide tube 8. A belting 16 (see FIG. 1) wraps about the gear belt pulley 15 and the motor E. As the belting 16 is driven by the motor E, the drive base 4 rotates the guide tube 8, rotating with it the chuck 5. The device C may be driven by other conventional systems such as chain drive system instead of the illustrated belting drive system.

Figure 4:
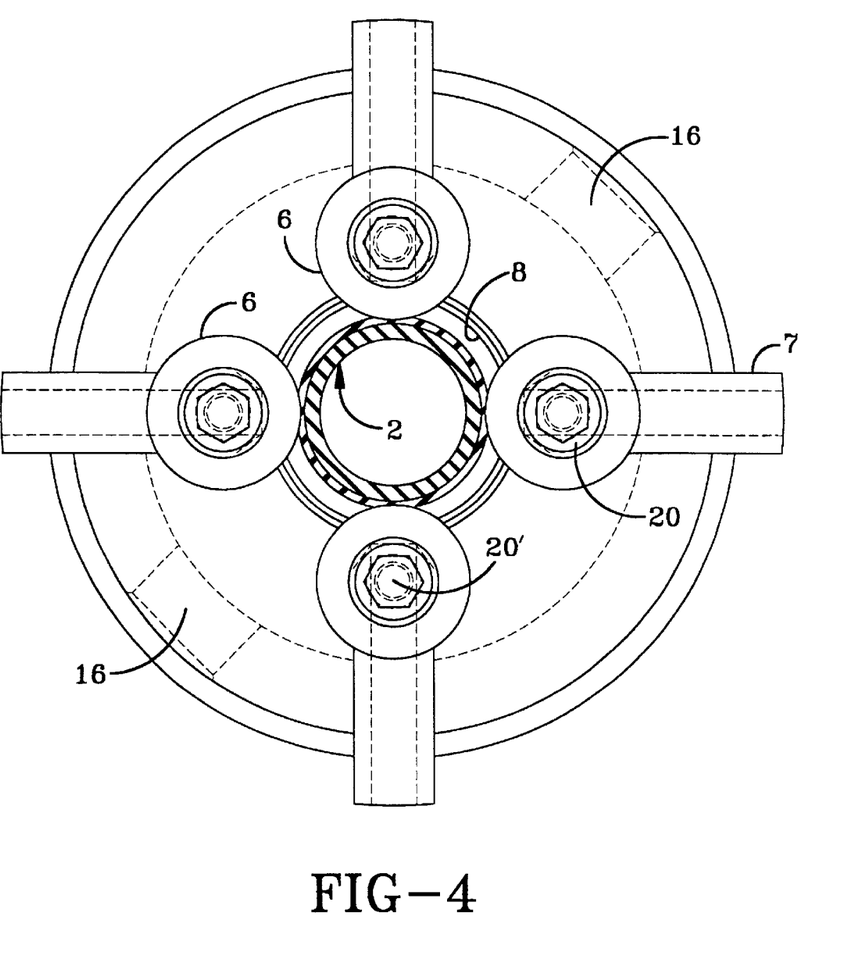
FIG. 4 is a schematic of the front view of the hose cover texture apparatus.

Adjacent to the drive base 4 is the chuck 5. The chuck 5 is mounted on the extending ring plate 10 of the guide tube 8. The chuck 5 employs a scroll gear (not shown) which operates to adjust and vary the locations of the chuck jaws 7, moving the chuck jaws 7, see FIG. 1 and further discussion below, in and out with respect to the centerline of the guide tube 8. Movement of the chuck jaws 7 is accomplished by the use of a chuck jaw wrench inserted into a turning key 16. Turning keys 16 are located at opposing points on the outside of the chuck 5, as illustrated in FIG. 4. Rotation of the turnkey 16 by means of the wrench rotates the internal scroll to feed the chuck jaws 7 in and out by means of the scroll gear. The chuck jaws 7 are inserted into the chuck jaw housings 17, with the first groove 18 resting adjacent the scroll gear (see FIGS. 5 and 6). As the scroll gear is rotated, the chuck jaw 7 is threaded onto the chuck 5 by means of the chuck jaw teeth 19.

FIG. 4 illustrates the front view of the texture device C. Mounted on the chuck 5 is a set of chuck jaws 7 in the manner described above. For applying the desired texture to the hose 2, a texturing means is mounted onto each chuck jaw 7. Illustrated is one embodiment of the texturing means, a set of texture rollers 6. The chuck jaws 7 are mounted at equal intervals about the chuck 5. The centerline of the texture roller 6 is perpendicular to the centerline of the guide tube 8 and the hose 2 traveling through the texture device C. As described above, the chuck jaws 7 are moved in and out, relative to the centerline of the guide tube 8, by means of the internal scroll gear. Varying the distance of the chuck jaws 7 permit the inventive texturing device to accommodate a range of hose diameters.

Other conventional chucks 5 which may be used in the disclosed invention may employ individually moveable chuck jaws 7, wherein there is a turning key 16 for each individual chuck jaw 7. Also envisioned for use with the disclosed texture device C may be a chuck 5 with more or less than the illustrated four chuck jaws 7 wherein a number of the chuck jaws 7 may move independently or together in a defined series. For example, in a six chuck jaw 7 system, four of the jaws 7 may move together and the remaining two jaws 7 may move together but separate from the first four.

The chuck jaws 7 are illustrated at equal spaced intervals, spaced 90° from each other. However, due to the desired texture, the jaws 7 may be modified for offset, unequal mounting of the texture rollers 6 or pens 22. For such a structure, the jaws 7 would be provided with an additional internal scroll gear and associated turnkey 16.

Figure 5:
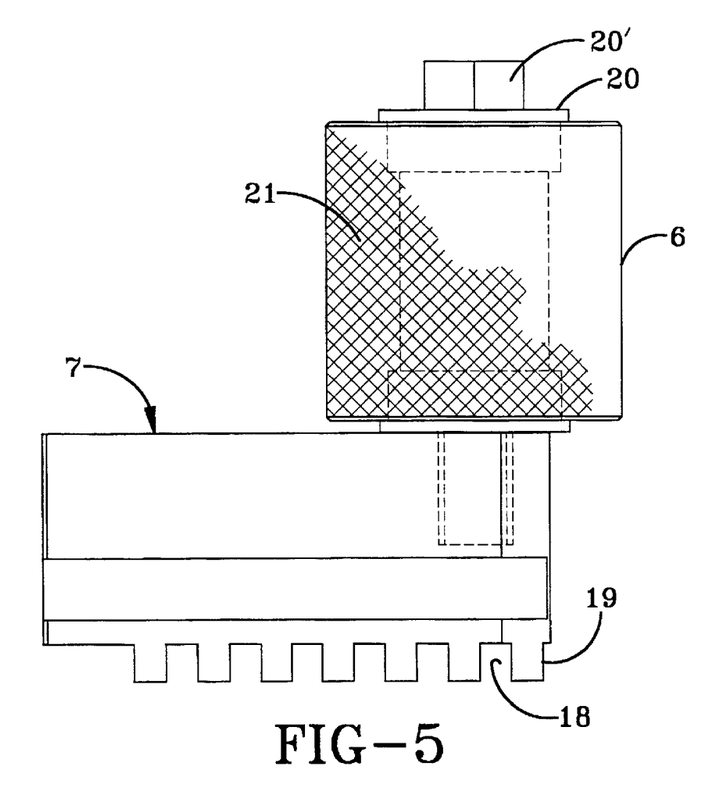
FIG. 5 illustrates one embodiment of the texturing means.

FIG. 5 illustrates one embodiment of the texture rollers 6. The roller 6 is mounted at one end of the chuck jaw 7. The underside of the chuck jaw 7 is provided with a series of teeth 19 for mounting the chuck jaw 7 onto the chuck 5. The internal configuration of the roller 6 includes a press-fit bearing 20, permitting the roller 6 to freely rotate on the chuck jaw 7 as the chuck 5 rotates about the hose 2 being fed through the texture device C. The roller is secured to the chuck jaw by a bolt 20' extending through the roller and into the chuck jaw. When in operation, the hose 2 is subject to a double rotation, the first rotation of the guide tube 8 and attached chuck 5, and the rotation of each individual roller 6, creating a complete helical wrapped texture on the hose 2. The illustrated roller 6 has a diamond knurl pattern 21 on the surface for imprinting on the hose 2.

For a different texture of the hose 2, the following elements may be varied: the roller length, pitch of the roller 6 (that is, the angle the rollers 6 contact the hose 2), the knurl depth on the roller, and the speed of the texture device C. Possible texture faces are diamond knurls, square knurl, slotted knurl, or any other type of conventional texture. The chuck 5 may be mounted with differing knurls wherein three of the rollers 6 have identical patterns and the fourth texturing means may be different, such a pen 22, or flat surface roller 6 to provide for either helically striping or a smooth helical surface for providing information onto the textured hose 3. The selection of knurl textures is dependent upon the desired final look of the hose 3.

Figure 6:
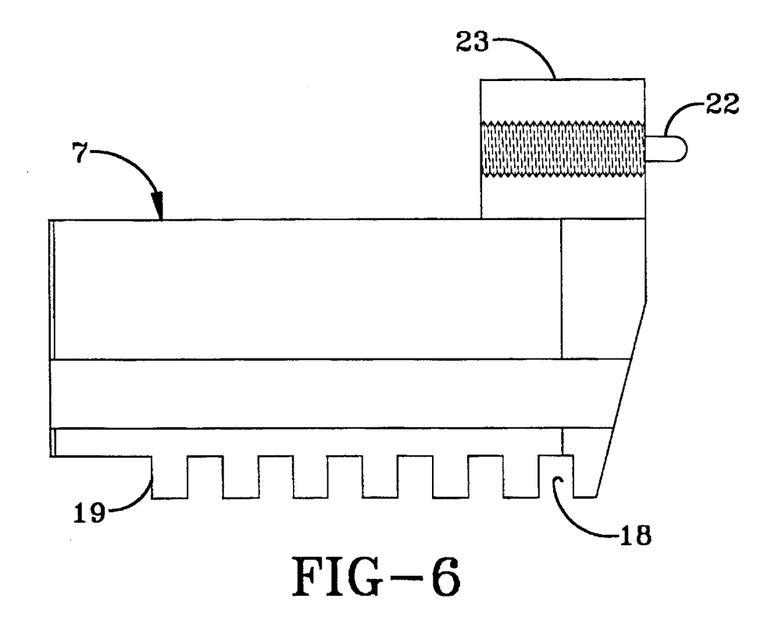
FIG. 6 illustrates another embodiment of the texturing means.

To obtain a fine helically wrap look: a scribing pen 22, as illustrated in FIG. 6, may be used. The scribe pen 22 is spring loaded into a chuck extension 23, permitting the pen 22 to move with the varying OD of the hose 2, preventing the pen 22 from gouging into the hose 2, as the hose 2 travels through the texture device C. Similar to variations in the roller texture 21, the pen configuration may be varied, from the illustrated rounded point to a very fine point, as well as varying the diameter of the pen 22.

The texturing device C employing the chuck 5 provides for an automatic adjustment of the texturing means for differing OD hoses by means of the internal scroll gear, ensuring that all of the chuck jaws 7 are equi-spaced from the centerline of the guide tube 8. As discussed above, a more complex chuck 5 may be used wherein not all of the chuck jaws 7 are manipulated by the same internal scroll gear. Individual placement of each texturing means may also be achieved by the texturing device C as illustrated in FIG. 7.

Figure 7:
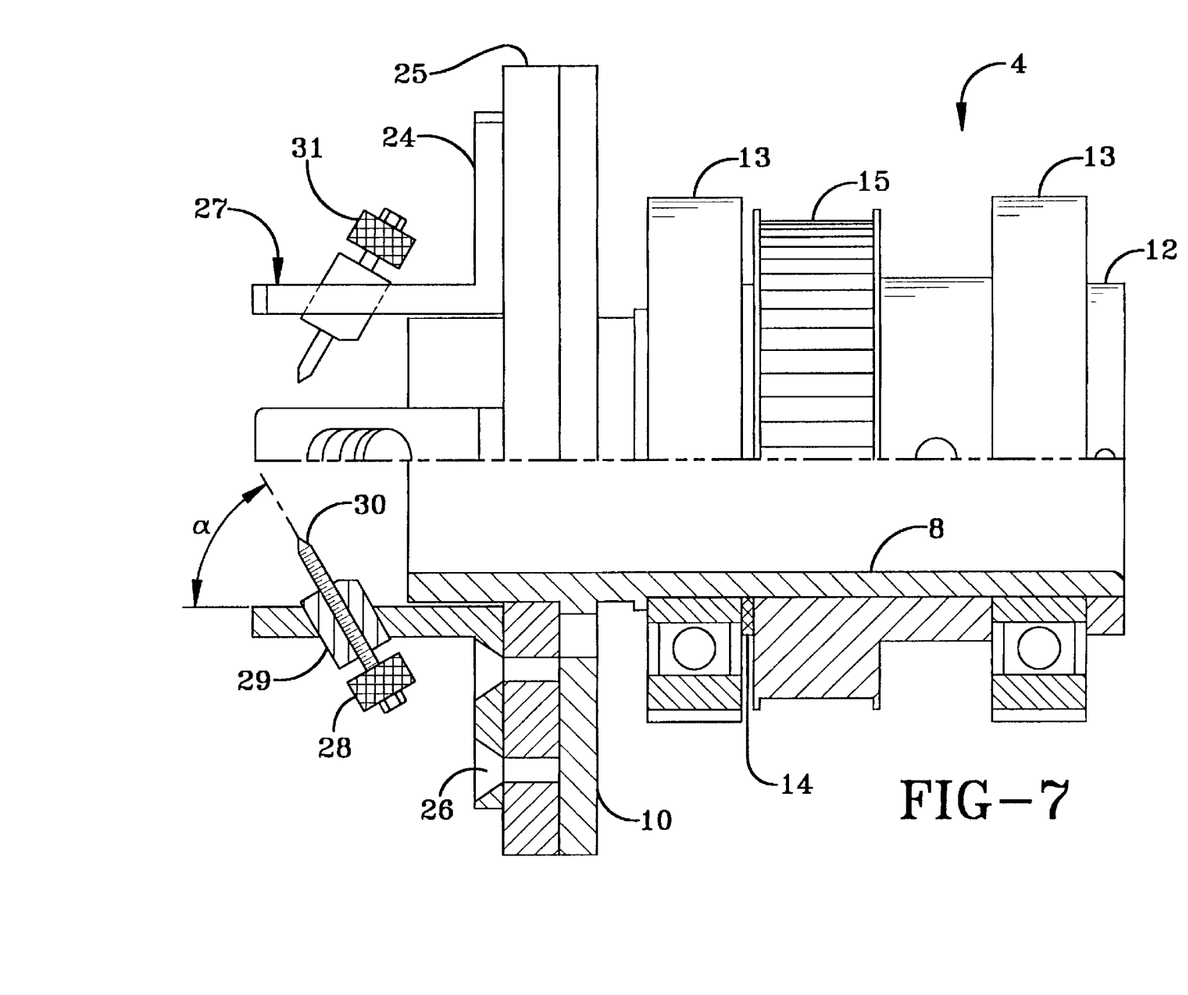
FIG. 7 is a partial sectional side view of a second embodiment of the inventive hose cover texture apparatus.

FIG. 7 illustrates a second embodiment of the inventive texturing device C'. The drive means 4 is a composite of the locking ring 12, gear belt pulley 15, two self-aligning bearings 13, and an interior shim 14 between the gear belt pulley 15 and one bearing 13. The gear belt pulley 15 is illustrated as mounted on the guide tube 8 in a position juxtaposed from that FIGS. 1 and 3; either configuration is operable in the inventive device C or C'. The left hand portion of the device C' is a set of four brackets 24 mounted on a faceplate 25. The faceplate 25 is attached to the extending faceplate 10 of the guide tube 8. The brackets 24 are secured to the faceplate by the illustrated countersunk screws 26, other conventional attachment means, or are formed integral with the faceplate 25.

Along the extending portion 27 of the brackets 24 are texturing means. A scribing pen 28 is threaded into a penholder 29. The illustrated scribing pen 28 is a dual function pen defined by a scribing point 30 at one end and a scribing roller 31 at the other end. The scribing roller 31 is mounted at the end of the scribing pen in a manner similar to that of the texture roller 6 on the chuck jaw 7. The roller 31 is mounted with press-fit bearings at each end so that the roller 31 will rotate when in contact with the hose 2. The pen 28 may also be defined by only the point 30 or only the scribing roller 31. The spacing between the hose 2 and the scribing pens 28 is adjusted by varying the threaded length of the pens 28 in the penholders 29.

The penholder 29 is inclined at an angle of 90° to 10° to the bracket-extending portion 27. When using the scribing point 30 for application of the texture onto the hose 2, as the inclination angle of the pen holder 29 is closer to 90° a finer groove is applied to the hose 2. However, if the inclination angle is greater than 90°, gouging of the hose cover may occur. When using the scribing roller 31 to provide the applied texture to the hose 2, as the inclination angle is closer to 10° more of the surface of the roller 31 contacts the hose 2.

To vary the inclination angle of the pen holder 29, and thus the contact angle between the texturing means and the hose 2, the pen holder 29 may be mounted in the bracket extensions 27 in a manner so as to provide for varying the inclination angle. Alternatively, the hose manufacturer may retain a plurality of interchangeable brackets 24 with fixed angle penholders 29 that are changed on the face plate 24 to achieve differing textures.

The configuration of the scribing point 30 and the scribing roller 31 may be varied in the manners previously discussed in relation to the texture rollers 6 and the scribe pen 22.

The embodiment of the texturing device C' illustrated in FIG. 7 provides for variety in the resulting hose texture configuration. The texturing device C' may be modified as the following examples illustrate. The number of brackets mounted may vary from two to at least six, being limited only by the size of the faceplate and the width of the bracket. The distance of the scribing pens 28 may be varied individually. The inclination angle of the penholders 29 may vary. A combination of the scribing roller and the scribing point may be used, as discussed previously in relation to the first embodiment of the texturing device.

Figures 8, 10:
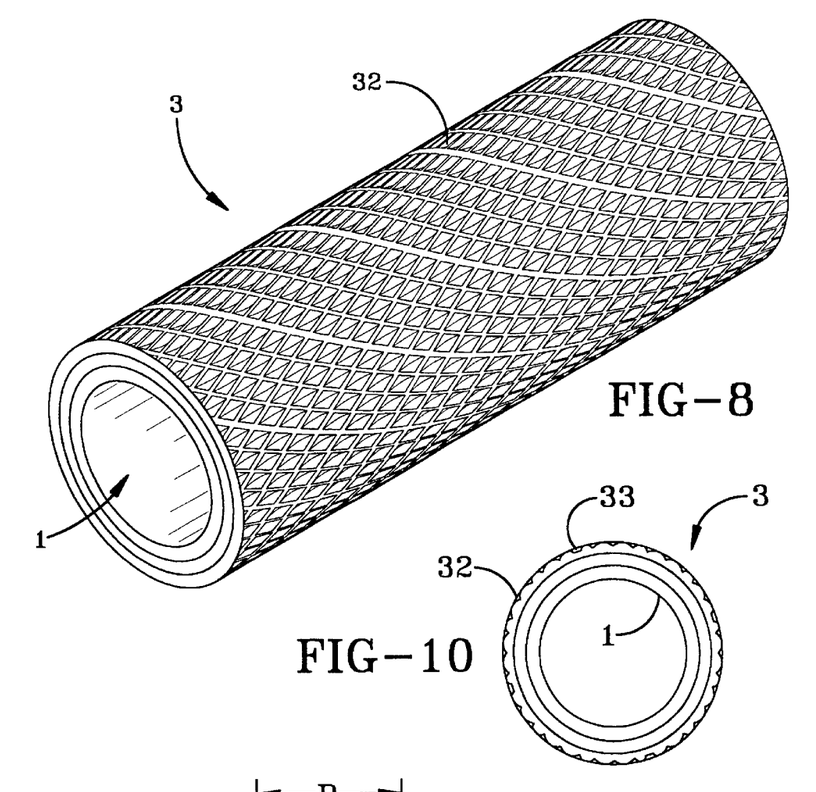
FIGS. 8 and 9 are one embodiment of the resulting hose.
FIG. 10 is a cross-sectional view of the textured hose.
Figure 9:
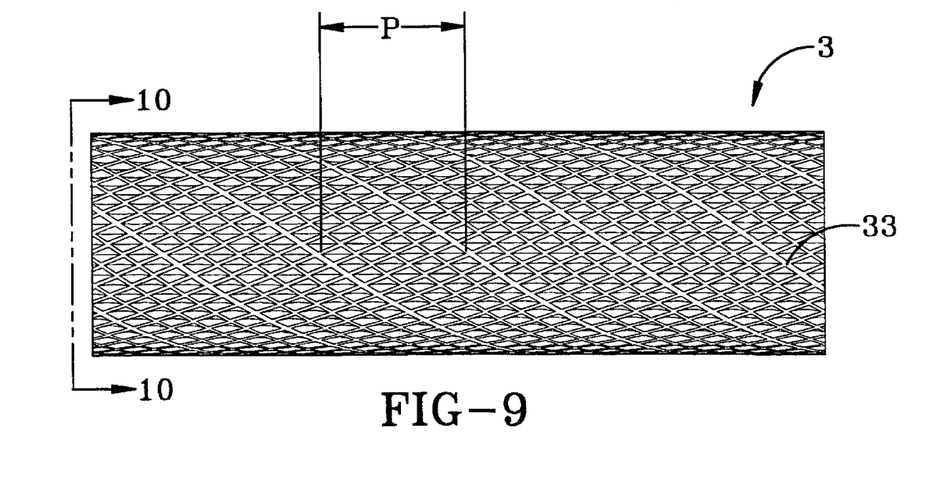

FIGS. 8 to 10 illustrate one embodiment of the resulting textured hose 3. The hose 3 is a multi-layered laminate with an outermost cover lay that is imprinted by the inventive texture device C, C'. The imprinted pattern 32 is the inverse of the pattern of the texture roller 6 or scribing roller 31. The illustrated pattern 32 is a continuous diamond knurling, separated by continuous helical lines 33. The pitch length P of the imprinted pattern is proportional determined by the length of the roller 6 or 31. If only a scribing pen 22 or 30 is used, the hose texture 32 would be a plurality of continuous helical grooves 33.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention.

What is claimed is:

1. An apparatus for imprinting a cylindrical element (2) comprising a guide (8), a drive member (4), and texturing element (5, 25), the guide (8) through which the cylindrical element (2 is guided being tubular, the apparatus being characterized by:

the drive member (4) being associated with the guide (8) to cause rotation of the guide (8), and;

the texturing element (5,25) rotating with the guide (8) to imprint the cylindrical element (2) and the distance between the texturing element (5,25) and the surface of the cylindrical element (2) is variable.

2. An apparatus in accordance with claim 1 wherein the variable distance is realized by either a chuck jaw (7) or at least one bracket (24).

3. An apparatus in accordance with claim 1 wherein the texturing element (5, 25) comprises either at least one knurling texture roller (6, 31) or at least one texturing pen (22, 30).

4. A method of imprinting a cylindrical element (2) comprising guiding the element (2) through a cylindrical guide (8) and imprinting the surface of the cylindrical element (2), the method being characterized by:

rotating the guide (8) about the cylindrical element (2);

rotating a texturing element (5,25) with the guide (8) to imprint the cylindrical element (2); and varying the distance of the texturing element (5,25) to the cylindrical element (2) prior to imprinting of the cylindrical element (2).

5. A method in accordance with claim 4 herein varying of the distance is achieved by either a chuck jaw (7) or at least one bracket (24).

6. A method in accordance with claim 4 further comprising rotating a plurality of texture rollers (6,31) along the surface of the cylindrical element (2).

7. A method in accordance with claim 4 further comprising variably pressing at least one scribing pen (22, 30) onto the surface of the cylindrical element (2).

* * * * *